US012610239B2

(12) United States Patent
Celozzi et al.

(10) Patent No.: US 12,610,239 B2
(45) Date of Patent: Apr. 21, 2026

(54) TRUST LEVEL IN NETWORK SLICES

(71) Applicant: Telefonaktiebolaget LM Ericsson (publ), Stockholm (SE)

(72) Inventors: Giuseppe Celozzi, Naples (IT); Luca Baldini, Rome (IT); Daniele Gaito, Naples (IT); Gaetano Patria, San Prisco (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 334 days.

(21) Appl. No.: 18/267,861

(22) PCT Filed: Dec. 18, 2020

(86) PCT No.: PCT/EP2020/087186
§ 371 (c)(1),
(2) Date: Jun. 16, 2023

(87) PCT Pub. No.: WO2022/128126
PCT Pub. Date: Jun. 23, 2022

(65) Prior Publication Data
US 2024/0056810 A1 Feb. 15, 2024

(51) Int. Cl.
*H04W 12/08* (2021.01)
*H04L 9/40* (2022.01)

(52) U.S. Cl.
CPC ......... *H04W 12/08* (2013.01); *H04L 63/1433* (2013.01)

(58) Field of Classification Search
CPC ........................... H04W 12/08; H04L 63/1433
(Continued)

(56) References Cited

U.S. PATENT DOCUMENTS

| | | | |
|---|---|---|---|
| 8,635,662 B2* | 1/2014 | Lang | G06F 21/31 |
| | | | 713/168 |
| 9,686,234 B1* | 6/2017 | Dorwin | G06F 21/60 |

(Continued)

FOREIGN PATENT DOCUMENTS

| | | |
|---|---|---|
| EP | 3529949 A1 | 8/2019 |
| EP | 3696700 A1 | 8/2020 |

(Continued)

OTHER PUBLICATIONS

Niu, B. et al., "5G Network Slice Security Trust Degree Calculation Model", 2017 3rd IEEE International Conference on Computer and Communications, Dec. 13-16, 2017, pp. 1150-1157, IEEE.

(Continued)

*Primary Examiner* — Samson B Lemma
(74) *Attorney, Agent, or Firm* — Weisberg I.P. Law, P.A.

(57) ABSTRACT

The invention relates to a method for operating a slice management entity (100) configured to manage a network slice of a cellular network, the method comprising: —periodically determining a trust level of the network slice based on time dependent trust values of network components used by the network slice, —determining whether the determined trust level of the network slice is lower than a minimum threshold level, wherein in the affirmative, —adapting a controlling of at least one of the network components of the network slice to obtain a new trust value for the at least one network component, wherein the new trust level of the network slice is above the minimum threshold level and is calculated taking into account the new trust value of the adapted controlling of the at least one network component.

18 Claims, 11 Drawing Sheets

(58) Field of Classification Search
USPC .......................................................... 726/26
See application file for complete search history.

(56)                          References Cited

U.S. PATENT DOCUMENTS

| | | | |
|---|---|---|---|
| 10,349,240 | B2 * | 7/2019 | Senarath ................. H04W 4/24 |
| 11,456,882 | B2 * | 9/2022 | Kravitz ................. H04L 9/0819 |
| 2010/0043066 | A1 * | 2/2010 | Miliefsky ........... H04L 63/0263 |
| | | | 726/9 |
| 2014/0325234 | A1 * | 10/2014 | Shiyafetdinov ..... G06F 21/6218 |
| | | | 713/182 |
| 2016/0352924 | A1 * | 12/2016 | Senarath ............... H04M 15/66 |
| 2016/0353268 | A1 * | 12/2016 | Senarath ............... H04L 47/805 |
| 2017/0295197 | A1 * | 10/2017 | Parimi .................... H04L 63/10 |
| 2020/0195495 | A1 * | 6/2020 | Parker .................... H04L 41/40 |
| 2020/0314134 | A1 * | 10/2020 | Izrael ................. H04L 63/1433 |
| 2022/0217540 | A1 * | 7/2022 | Choyi ................... H04W 28/24 |
| 2022/0321330 | A1 * | 10/2022 | Hu .......................... H04L 63/10 |

FOREIGN PATENT DOCUMENTS

| | | | |
|---|---|---|---|
| WO | 2018074953 | A1 | 4/2018 |
| WO | 2018075930 | A1 | 4/2018 |
| WO | 2021025600 | A1 | 2/2021 |

OTHER PUBLICATIONS

3rd Generation Partnership Project, "3rd Generation Partnership Project, Technical Specification Group Services and System Aspects; Telecommunication management; Study on management and orchestration of network slicing for next generation network (Release 15)", Technical Report, 3GPP TR 28.801 V15.1.0, Jan. 2018, pp. 1-75, 3GPP.
3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.4.0, Mar. 2020, pp. 1-430, 3GPP.
GSM Association, "Generic Network Slice Template", Official Document NG.116—Generic Network Slice Template, Version 2.0, Oct. 16, 2019, pp. 1-61, GSMA.
3rd Generation Partnership Project, "3rd Generation Partnership Project; Technical Specification Group Core Network and Terminals; 5G System; Network Slice Selection Services; Stage 3 (Release 16)", Technical Specification, 3GPP TS 29.531 V16.2.0, Mar. 2020, pp. 1-56, 3GPP.
3rd Generation Partnership Project, "3rd Generation Partnership Project; Technical Specification Group Services and System Aspects; Study on the security aspects of the next generation system (Release 14)", Technical Report, 3GPP TR 33.899 V1.3.0, Aug. 2017, pp. 1-605, 3GPP.
ETSI, "Network Functions Virtualisation (NFV) Release 3; Security; Security Management and Monitoring specification", Group Specification, ETSI GS NFV-SEC 013 V3.1.1, Feb. 2017, pp. 1-54, ETSI.
ETSI, "Network Functions Virtualisation (NFV) Release 3; Security; System architecture specification for execution of sensitive NFV components", Group Specification, ETSI GS NFV-SEC 012 V3.1.1, Jan. 2017, pp. 1-17, ETSI.
ETSI, "Network Functions Virtualisation (NFV) Release 3; Management and Orchestration; VNF Descriptor and Packaging Specification", Group Specification, ETSI GS NFV-IFA 011 V3.3.1, Sep. 2019, pp. 1-85, ETSI.
ETSI, "Network Functions Virtualisation (NFV) Release 3; Evolution and Ecosystem; Report on Network Slicing Support with ETSI NFV Architecture Framework", Group Report, ETSI GS NFV-EVE 012 V3.1.1, Feb. 2017, pp. 1-35, ETSI.
ETSI, "Network Functions Virtualisation (NFV) Release 3; Management and Orchestration; Network Service Templates Specification", Group Specification, ETSI GS NFV-IFA 014 V3.3.1, Sep. 2019, pp. 1-46, ETSI.

* cited by examiner

300

310    Module for determining trust level

320    Module for determining level lower threshold level

330    Module for adapting at least one network component

100

120   Processing unit

110   Interface

130   Memory

400

Module for determining trust values — 410

Module for determining whether value has changed — 420

Module for storing new trust value — 430

Module for determining wheter amended network component is used — 440

Module for informing slice mangement — 450

200

Processing unit — 220

Memory — 230

Interface — 210

TRUST LEVEL IN NETWORK SLICES

TECHNICAL FIELD

The present application relates to a method for operating a slice management entity configured to manage a network slice of a cellular network, to the corresponding slice management entity, to a method for operating a security management entity configured to orchestrate network slices in a cellular network and to the corresponding security management entity. Furthermore, a system comprising the slice management entity and the security manager entity is provided, a computer program comprising program code and a carrier comprising the computer program.

BACKGROUND 5G technology is the last evolution of mobile telecommunication. It improves 4G (and all previous mobile technologies), in particular 5G improves:

Data transmission speed
Bandwidth
Latency

Due to its characteristics 5G will be applied in fields until now not applicable for mobile technology, such as application requiring ultra low latency, mission critical application etc.

In addition some applications like remote surgery, autonomous vehicles, etc. will require High Availability (HA) level not satisfied by the current telecom infrastructure.

5G communication should provide automation in vertical domains which necessitates high reliability, and high communication service availability. Moreover, communications high reliability, and high communication service availability, and other services, may run in parallel on the same 5G infrastructure. This parallel use is achieved through slicing. 5G networks in combination with network slicing, permit business customers to enjoy connectivity and data processing tailored to the specific business requirements that adhere to a Service Level Agreement (SLA) agreed with the mobile operator.

Network Slices which needs very low latency, ultra-reliability and very high availability are for example related to the following services (URLLC (Ultra-reliable low-latency communication) services):

Connected Cars: for traffic safety and controls. An obstacle 100 mt ahead must be immediately notified to a car which is travelling toward it.

Connected Vessels: for logistics, tracking and fleet management

Remote Health Care
Remote Manufacturing
Remote surgery

Network slicing has emerged as a major new networking paradigm for meeting the diverse requirements of various vertical businesses in virtualized and softwarised 5G networks. A network slice is a dynamically created logical end-to-end network with an optimized topology to serve a specific use case—a service class or a customer.

A mobile network operator will be able to slice the network resources (routers and links) along with compute and storage resources (for running NFVs and cloud apps) and allocate them to a service. Though the technology is being spearheaded by the cellular telecommunications-focused 3rd Generation Partnership Project (3GPP), network slicing is likely to find application in fixed networks as well.

Two appealing features of network slicing are orchestration and isolated performance guarantees. An orchestrator can slice a network, along with compute and storage resources, and run a service in that slice. Isolated performance guarantees ensure one slice cannot interfere with the performance of another slice. One slice of the network may provide mission-critical services (such as emergency response), another slice might serve traditional cellular users, a third slice might be allocated for Internet of Things devices, and perhaps a fourth slice might be for an MVNO (Mobile Virtual Network Operator) customer, and so on.

Network slicing is a form of virtual network architecture using Software Defined Network (SDN) and Network Functions Virtualization (NFV) technologies for leveraging network functions and services in the slices. SDN and NFV are now being commercially deployed to deliver greater network flexibility by allowing traditional network architectures to be partitioned into virtual elements that can be linked (also through software).

Network slicing allows multiple virtual networks to be created on top of a common shared physical infrastructure.

One of the key requirements of the 5G networks will be to support a variety of vertical industries such as smart grid, e-health and smart city. These verticals derive different use cases which impose stricter requirements than today services do. It is well understood that these requirements can be satisfied after significant improvements in the architecture are done. Network slicing can meet the diverse requirement for verticals and is thus a key concept in the coming 5G Network.

An end-to-end (E2E) service might comprise different domains, each one having different technologies. The E2E slice will comprise sub-slices that belong to one or more domains. The slice is an instance that will implement and run the services requested by the verticals independently of each other with a distinct set of resources. Therefore, slicing is an enabler to support the verticals on a single infrastructure while maintaining and satisfying the QoS guarantees and SLA agreements with the verticals.

A telecom system may be composed of different physical instances that operate on different physical hardware, each computing instance is called a component of the node and the totality of the components a node, a node is a telecommunication system; i.e. a PNF (Physical Network Function).

Complex systems like those, when virtualized (VNF) can be mapped to more than one virtual machine. On a server hardware more than one node component can run in a separate virtual machine and many virtual machines can run on server hardware inside the cloud data center.

When designing the virtual infrastructure services, administrators consider both the structure of the individual virtual machine as well as the interactions between all of the virtual machines in the environment, as they are brought online, move, and expire, must be considered.

Common Vulnerabilities and Exposures (CVE)

CVE® is a list of entries—each containing an identification number, a description, and at least one public reference—for publicly known cybersecurity vulnerabilities.

CVE Entries are used in numerous cybersecurity products and services from around the world, including the U.S. National Vulnerability Database (NVD).

Some particular vulnerabilities, called Speculative Execution Vulnerabilities can affect the Linux Kernel and BIOS microcode like for example there are some families of speculative vulnerabilities like Spectre, Meltdown, Lazy FP, etc. For each family one or more CVE can be present.

https://cve.mitre.org/5 adapt a controlling of the at least one network component of the network slice to obtain a new trust value for the at least one network component. The new trust level of the network slice is then above the minimum threshold level and is

| CVE | Alias | Micro-code update needed | Kernel cmdline parameters to toggle off | Links |
|---|---|---|---|---|
| CVE-2017-5753 (1) | Spectre V1 | | N/A | https://www.suse.com/support/kb/doc/?id=7022512 |
| CVE-2017-5715 (1) | Spectre V2 | Y | nospectre_v2nospec | https://www.suse.com/support/kb/doc/?id=7022512 |
| CVE-2017-5754 (1) | Spectre V3 Meltdown | | nopti | https://www.suse.com/support/kb/doc/?id=7022512 |
| CVE-2018-3639 (2) | Spectre V4 | Y | nospec_store_bypass_disable | https://www.suse.com/security/cve/CVE-2018-3640/ |
| CVE-2018-3665 (2) | Lazy FPU | | eagerfpu=off | https://www.suse.com/support/kb/doc/?id=7023076 |

It should be noted that the table above is just an example for a CVE. While 5G is increasingly spreading around the world, concern about the security of the 5G network and about the data passing through it is growing at the same time.

Many Countries are wondering about 5G security and how and to whom to entrust 5G management. The problem of trustability is applicable also to slices multi-operators and/or multi-domains.

A stop in a 5G network will cause not only communication problems (that is always serious), but can create problems in industry, transportation, power and so on.

On the other hand, security comes at a cost that is not necessary for all networks.

Accordingly, a need exists to improve the situation discussed above and to be able to somehow control a trustability or trust level of a network slice.

SUMMARY

This need is met by the features of the independent claims. Further aspects are described in the dependent claims.

According to a first aspect a method for operating a slice management entity is provided which is configured to manage a network slice of a cellular network. The method comprises the step of periodically determining a trust level of the network slice based on time-dependent trust values of network components used by the network slice. Further it is determined whether the determined trust level of the network slice is lower than a minimum threshold level. If this is the case a controlling of at least one of the network components of the network slice is adapted to obtain a new trust level for the at least one network component. The new trust level of the network slice is then above the minimum threshold level and is calculated taking into account the new trust value obtained with the adapted controlling of the at least one network component.

Furthermore, the corresponding slice management entity is provided which is operative to work as discussed above or as discussed below.

As an alternative, the corresponding slice management entity comprises a first module configured to periodically determine a trust level of the network slice based on time-dependent trust values of the network components used by the network slice. A second module of the slice management entity can be configured to determine whether the determined trust level of the network slice is lower than a minimum threshold level. If this is the case a third component of the slice management entity can be configured to calculated taking into account the new trust value which is determined based on the adapted controlling of the at least one network component.

With the described method for operating the slice management entity it is possible to introduce a new mechanism at slice level to automatically evaluate and update a trust level of a slice based on the slice components and the trust values of the slice components. The trust level of the network slice is determined by checking the trust values of the network components of the network slice and it is possible to select a certain trust level for a slice to realize its specific service.

Furthermore, a method for operating a security management entity is provided which is configured to orchestrate network slices in a cellular network, wherein the network slices are generated from available network components. The method comprises the step of periodically determining trust values of the available network components. Furthermore, it is determined if the trust value of any of the available network components has changed to a new trust level, wherein the new trust level belongs to an amended network component. Furthermore, the new trust value for the amended network component is stored and it is determined whether the amended network component is used in one of the network slices. If this is the case, a slice management entity of the cellular network is informed of the new trust value of the amended network component. Furthermore, the corresponding security management entity is provided.

As an alternative a security management entity is provided comprising a first module configured to periodically determine trust values of the available network components. Furthermore, a second module of the security management entity is configured to determine if the trust value of any of the available network components has changed to a new trust value, wherein the new trust value belongs to an amended network component. The new trust value is then stored for the amended network component and it is determined whether the amended network component is used in any one of the network slices. If this is the case, a further component can be configured to inform a slice management entity of the cellular network of the new trust value of the amended network component.

Furthermore, a system is provided comprising the security management entity and the slice management entity.

Additionally a computer program comprising program code is provided wherein execution of the program code causes the slice management entity or the security management entity to carry out a method as discussed above or as discussed in further detail below.

Furthermore, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the application. Features of the above-mentioned aspects and embodiments described below may be combined with each other in other embodiments unless explicitly mentioned otherwise. Other devices, systems, methods, features and advantages will become apparent to one with skill in the art upon examination of the following detailed description and figures when read in conjunction with the accompanying drawings in which like reference numerals refer to like elements.

DETAILED DESCRIPTION OF DRAWINGS

Figure 1:
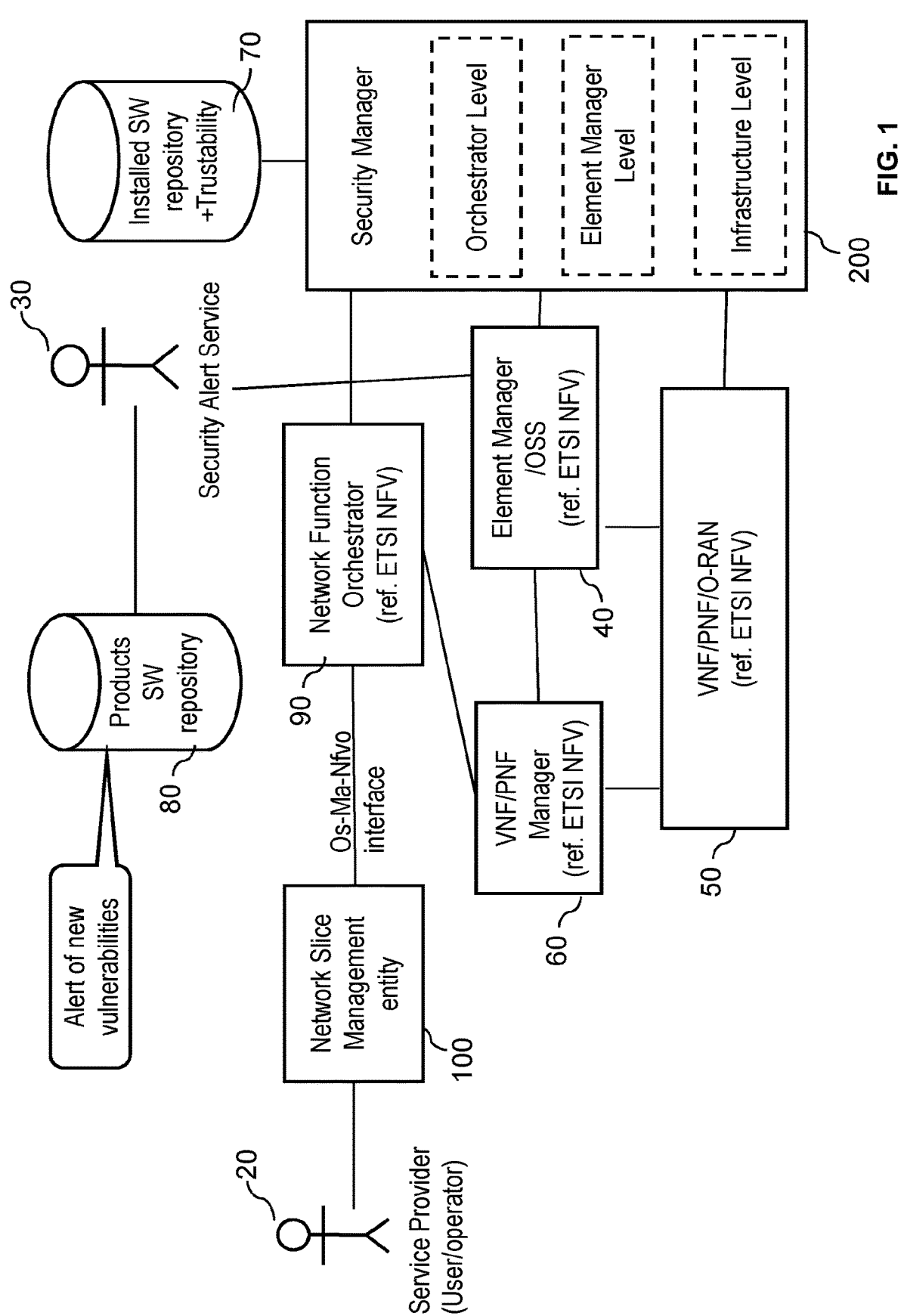
FIG. 1 shows a schematic architectural view of the system which is capable of controlling a trust level of a network slice.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may be implemented by an indirect connection or coupling. A coupling between components may be established over a wired or wireless connection. Functional blocks may be implemented in hardware, software, firmware, or a combination thereof.

FIG. 1 shows a schematic architectural view in which a slice management entity 100 is configured to control a provision of network slices having a certain trust level. Furthermore, a security management entity 200 is provided which monitors the network components of a slice and checks when the trust level of a network component changes so that the slice management entity can be informed accordingly.

Slices are mainly composed by virtual components such as VNFs or PNFs that can be affected by vulnerabilities and the vulnerability of a single slice component can have an unknown or severe security impact on the whole slice.

Given the above correspondence Slice Management can occur according to the framework sketched in FIG. 1 where the 3GPP slice related management functions can interface the ETSI NFVO through the Os-Ma-Nfvo interface.

A service provider or operator of a cellular network 20 can ask for a network slice having a certain trust level. As shown in FIG. 1, the system comprises a database 80 where the software products are stored and the database is informed or alerted of new vulnerabilities, such as the common vulnerabilities and exposures, CVE, discussed in the introductory part. A security alert service 30 can be provided which is able to alert the system of a changed trust value of a component which is used by a slice in a cellular network. An element manager 40 is configured to manage the different hardware and software components provided in a virtual environment which is used to generate a slice. The different virtual software components are provided to network functions 50 which are managed by a manager 60. Furthermore, a network function orchestrator 90 is provided and a database 70 comprising the installed software and trustability values for the different components.

The solution discussed below introduces a new mechanism at slice level to automatically evaluate and update the level of slices based on the single slice component trust value information which is periodically checked and updated. With such a mechanism in place each application will be able to require and select a certain trust level for the E2E slice to realize its specific service.

Each slice component, either a virtual network function, VNF or a physical network function, PNF, have an indication of the trustability level, i.e. a certain trust value.

The slice trust value can be a new Service Level Agreement (SLA) parameter. The indication of the trust value may be applied at each slice component. The trust level of the slice can be calculated from the trust values of each of the components of the slice.

A mechanism is proposed to verify and certify automatically that the requested e2e slice trustability level is really provided. As suggested in the ETSI GS NFV-SEC 012 standard [V3.1.1 (2017-01)] in clause 6.6, this mechanism could be reinforced using the concepts of Blockchain and Smart Contracts to certify slice trustability also in case that multi-operators are involved in the e2e slice creation.

Periodically either at any time new vulnerabilities are discovered, or at any update/upgrade of any single slice component, the component trust value is verified and any change is notified to the e2e slice management entity to update the e2e slice trustability level.

In case the e2e slice trustability level is decreased under the target value, the slice management entity will try to perform actions to recover the right trustability level, and will communicate the new value to the service provider who can in turn take actions, if the own actions are not enough. Possibly a slice rearrangement will be requested to comply with the target trustability value. In case it is not possible to re-arrange a slice with the requested e2e slice trustability, a new type of slice can be generated, e.g. a slice with extended monitoring or decide to add a specific security control to mitigate the situation.

It is proposed to use the existing Slice Differentiator (SD) field to map the Slice Trustability Level (STL) in all the present 5G Slice/Service type (SST).

The description below proposes to add to each slice component an indication of its trustability, the trust value. Furthermore a method is provided to dynamically calculate the trust level of the slice, wherein the slice trust level can be calculated periodically, and the availability of a slice with its current level of trust can be updated dynamically. Furthermore it is possible to select a slice with a required trust level. Furthermore a mechanism is disclosed which increases the monitoring level or the security controls for a slice having a trust level below a threshold.

The slice trust level is calculated from the trust values of the components of the slices. Preferably, it is determined from each of the components which are used to generate a slice. However, it is also possible that only a major part or a certain part of the components are used to determine the trust level of the slice.

In the following the expression trustability and trust level are used interchangeably and have the same meaning.

The trust level of a slice can be considered as a new property which could also be added in table 7.1.2.2-1 of ETSI GS NFV-IFA 011 V4.1.1 (2020-11) where a new row may be added in the attributes after the VNFD information element table as shown below:

| Attribute | Qualifier | Cardinality | Content | Description |
|---|---|---|---|---|
| Trustability | M | 1 | integer | Indicate the trustability of the VNF related to known vulnerabilities. |

Periodically, or at any event that can change the trust value of a slice component, the slice component trust value is automatically calculated and in case of a change and if the component is in use in one of the slices, the slice management entity is advised to take proper actions.

First of all, the calculation of the trust value of the components is discussed in more detail. Each time a slice component is updated or upgraded the trust value attribute should be updated as well according to the latest mitigations adapted for the new release of the software.

An example of a possible formula to obtain this value could be:

$$SCT = 100 - SCW \quad SCW = \left( \frac{\sum_{i=1}^{n} w_i * uCVE_i}{\sum_{i=1}^{n} w_i * tCVE_i} \right) * 100$$

Where:

SCW is the weakness of the slice component (opposite of the trustability).

SCT is the trustability of the slice component.

$w_x$ is the weight pre-defined for each single impact of a CVE if not mitigated.

$tCVE_x$ is the number of CVEs aggregated with weight $w_x$.

$uCVE_x$ is a subset of $tCVE_x$ indicating the number of not mitigated CVEs.

The same formula can be used dynamically and periodically by any entity controlling the VNF (VNFM or NFVO) to calculate the new value of SCT when the slice component is not updated because of new CVEs added in the CVE database.

The period of time to run the SCT calculation could be dependent by the slice trustability level requested, i.e. if it is requested a slice with high trustability level the control period is shorter.

Calculate Slice Trustability Level

Algorithm (first time and every time there is an update)

The slice management entity 100 (will calculate among the on-boarded NSD the slice trustability level considering the trust values of all slice components:

For all NSD constituent a nested NS.

For all vnfdld in the NSD the trustability slice property is read

The NSD constituent a nested NS and the vnfdld in the NSD are described in table 6.2.2.2-1 of ETSI GS NFV-IFA 014 V4.1.1 (2020-06) Network Functions Virtualisation (NFV) Release 3; Management and Orchestration; Network Service Templates Specification The slice trust level (E2EST) can be equal to the minimum trust value of slice components (an e2e slice is as trustable as its weakest component).

$$E2EST = MIN(SCT_1; SCT_2; \dots ;SCT_m)$$

Another way to calculate the e2e slice trustability is to do a weighted average of the slice components trust values. The weights can be defined at the same value for each component or pre-defined according to the relevance of the component role in 5G architecture.

$$E2EST = \sum_{i=1}^{m} W_i * SCT_i \text{ where } \sum_{i=1}^{m} W_i = 1$$

Alternatively, the e2e slice weakness (E2ESVV), opposite of trustability, could be also considered as the sum of the weakness of its components, if so, the algorithm has to calculate the (possibly weighted) sum of the weakness of slice components.

$$E2ESW = \sum_{i=1}^{m} SCW_i$$

$$E2EST=100-E2ESW$$

Where:

SCW$_i$ is the weakness of the slice component i$^{th}$ (opposite of the trustability).

SCT$_i$ is the trustability of the slice component i$^{th}$.

W$_i$ is the weight of the trustability of component i$^{th}$ compared to the trustability of the whole e2e slice.

E2EST is the e2e slice trustability.

E2ESW is the e2e slice weakness.

For any other way of calculating the weakness or trustability the algorithm can be easily adapted.

After a first allocation or a dynamic update of the allocated components, if the calculated e2e slice trust value does not satisfy the requested e2e slice trust value, slice management entity 100 can adopt the opportune re-organization of the NSD (for example modify an existing on-boarded NSD or create a new one) and finally inform the Service Provider 20.

Figure 2:
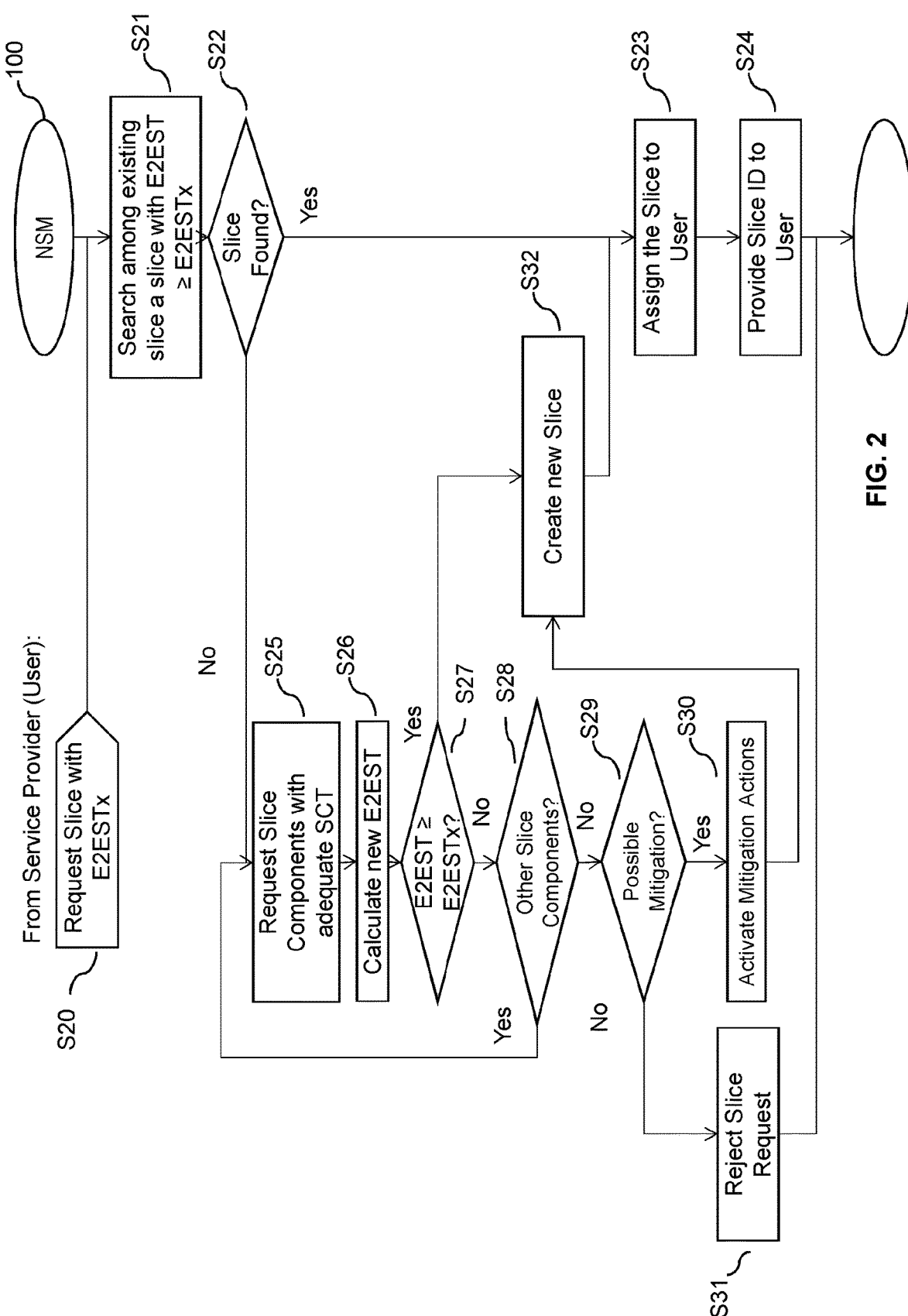
FIG. 2 shows a schematic view of a message exchange between the involved entities in order to create a slice having a certain trust level.

FIG. 2 shows a schematic message exchange between the entities involved.

In step S20 an operator or an operator of the service provider 20 requests a network slice for a certain service having a certain trust level, wherein this request is sent to the slice management entity 100 in step S21 the slice management entity searches among the existing slices whether there is a slice having the requested trust level. If a slice is found in step S22 the slice is assigned to the user in step S23 wherein a slice ID is provided to the requesting service provider or user in step S24.

If it is determined in step S22 that no slice can be identified having the required trust level a slice is requested with components which have the corresponding trust values with which a trust level of the slice can be generated (step S25). In step S26 the new trust level for the complete slice is calculated based on the trust values of the components as discussed above and it is checked in step S27 whether the determined trust level is higher than the threshold value as requested from the service provider. If this is not the case it is checked whether other slice components are available and the method is repeated with other slice components in step S28. If there are no other slice components it is checked in step S29 whether there is a possible mitigation. By way of example a slice rearrangement may be requested to comply with the target trust value. IN case it is not possible to rearrange the slice with the requested slice trust level, a new type of slice can be generated, e.g. a slice with extended monitoring or it can be decided to add a specific security control to mitigate the situation. If possible mitigation actions are found they are applied in step S30. If no possible mitigation action is found to slice request is rejected in step S31. In step S32 the new slice is finally created.

Figure 3:
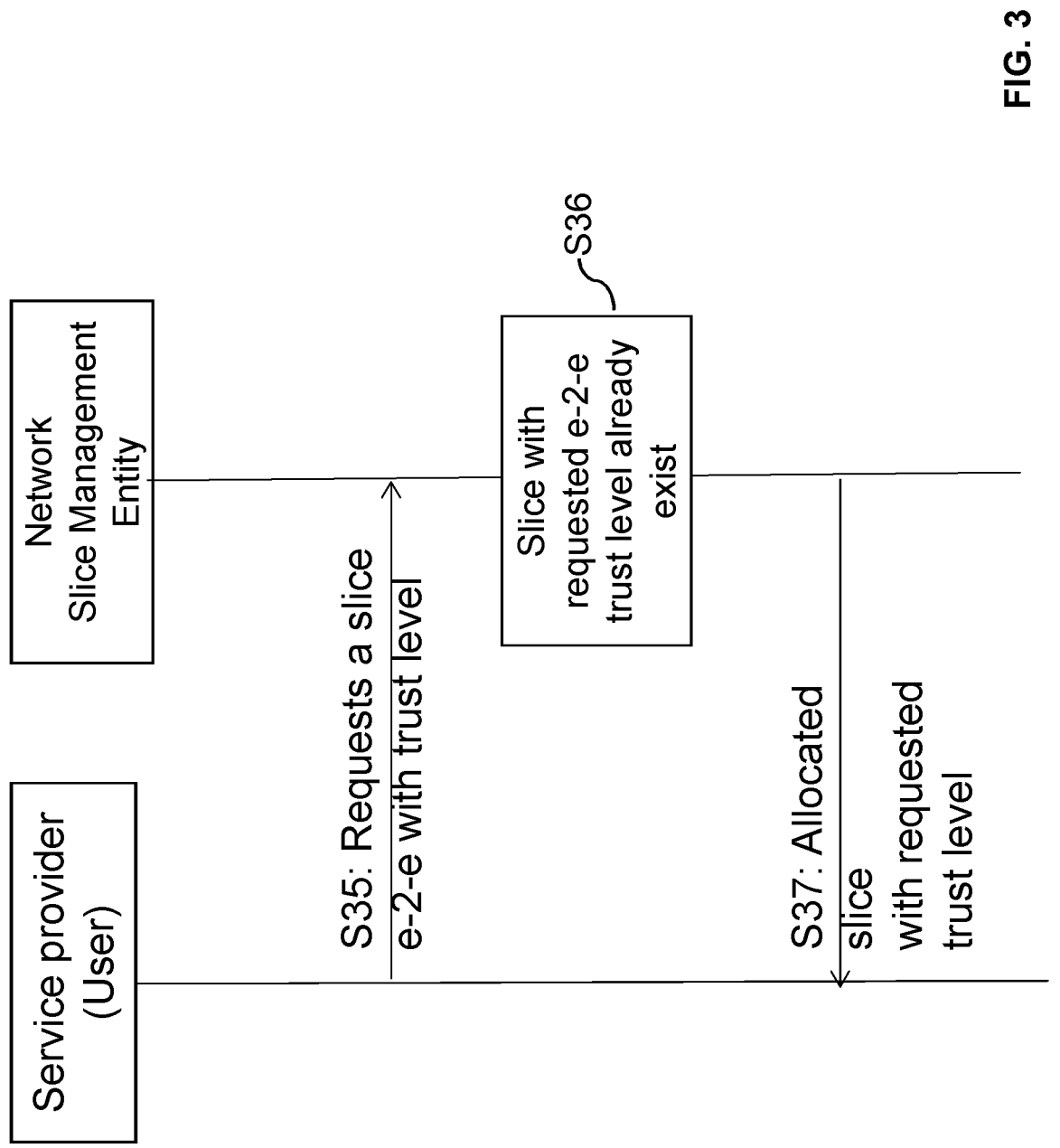
FIG. 3 shows a more detailed schematic view of a message exchange between the entities involved when a slice with a certain trust level is requested which already exists.

FIG. 3 shows a part of the method discussed in FIG. 2. In step S35 corresponding to step S20 the service provider transmits a request to the slice management entity for a slice having a certain trust level or security level. In step S36, the slice management entity determines that the slice with the requested trust level exists, so that it can be assigned in step S37 to the requesting service provider.

Figure 4:
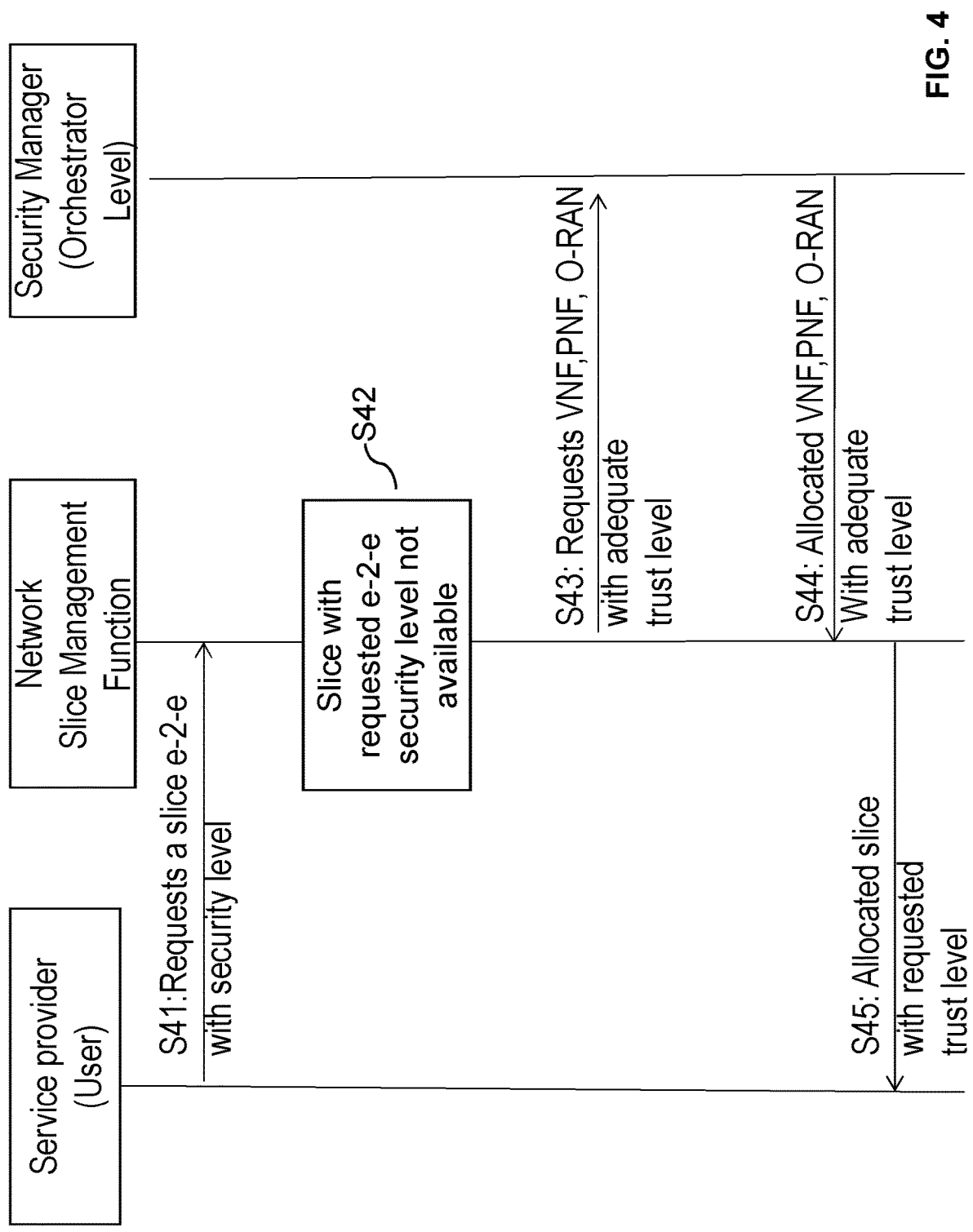
FIG. 4 shows a more detailed schematic view of a message exchange between the entities involved when a slice with a certain trust level is requested which is not yet existing.

FIG. 4 summarizes the situation when the corresponding slice does not exist. In step S41 the service provider again sends the request to the slice management entity asking for a slice having a certain trust level. In step S42 the slice management entity determines that the slice with the requested trust level cannot be made available to the service provider. Accordingly, in step S43 it sends a request to the security manager, the security management entity 200 requesting slice components with the needed trust value. The security management entity then allocates the required hard- and software components needed for setting up the slice in step S44 and informs the slice management entity 100 accordingly. The slice management entity 100 can then in step S45 allocate the slice to the service provider having the required trust level.

FIGS. 2 to 4 discussed the background when a slice having a certain trust level should be generated. In the following a possible implementation is discussed wherein the slice selection may be based on the slice service type.

Slice Selection Based on the Slice Service Type

As reported in clause 5.15.2.1 of 3GPP TS 23.501 V16.6.0 (2020-09)

An S-NSSAI identifies a Network Slice.

An S-NSSAI is comprised of:

A Slice/Service type (SST), which refers to the expected Network Slice behaviour in terms of features and services; (Standard SST values: eMBB, URLLC, M IoT, V2X)

A Slice Differentiator (SD), which is optional information that complements the Slice/Service type(s) to differentiate amongst multiple Network Slices of the same Slice/Service type.

An S-NSSAI can have standard values (i.e. such S-NSSAI is only comprised of an SST with a standardised SST value, see clause 5.15.2.2, and no SD) or non-standard values (i.e. such S-NSSAI is comprised of either both an SST and an SD or only an SST without a standardised SST value and no SD). An S-NSSAI with a non-standard value identifies a single Network Slice within the PLMN with which it is associated. An S-NSSAI with a non-standard value shall not be used by the UE in access stratum procedures in any PLMN other than the one to which the S-NSSAI is associated.

In the slice selection procedure described in 3GPP TS 29.531 V16.4.0 (2020-09) the selection may use the additional descriptor.

For determining the e2e slice trust level, one of the following methods or a combination of them can be used:

It could be configured explicitly to the UE (user equipment) and sent in a Registration Request message to the network using an existing parameter (such as an S-NSSAI in the Requested NSSAI where the SST is URLLC; the e2e slice trustability level can be decided by the SD part).

The e2e slice trustability level could be codified in the SD or in the nsiInformationList reported by the Network Slice Selection Service instance contacted by the AMF that has received the request from the UE. Below is reported the table 6.1.6.2.5-1 included in clause 6.1.6.2.5 "Type: AllowedSnssai" of 3GPP TS 29.531 V16.4.0 (2020-09) 3rd Generation Partnership Project; Technical Specification Group Core Network and Terminals; 5G System; Network Slice Selection Services; Stage 3 (Release 16)

TABLE 6.1.6.2.5-1

| | | | | Definition of type AllowedSnssai |
| Attribute name | Data type | P | Cardinality | Description |
| --- | --- | --- | --- | --- |
| allowedSnssai | Snssai | M | 1 | This IE shall contain the allowed S-NSSAI in the serving PLMN. |
| nsiInformationList | array(Nsi Information) | O | 1 . . . N | This IE may be present when the NSSF provides the allowed NSSAI information to the NF service consumer (e.g AMF). If present, this IE shall include the information related to the network slice instance corresponding to the allowed S-NSSAI. |
| mappedHomeSnssai | Snssai | O | 0 . . . 1 | When present, this IE shall contain the mapped S-NSSAI value of home network corresponding to the allowed S-NSSAI in the serving PLMN. |

Trust Level and Available Slices

The trust level can change over time due to new vulnerability found in the SW/HW used for the slice components or because updates of the SW/HW have been made in the systems used for the slice components. This might turn in a slice with a certain trust level not being available any more.

Users of a slice that has reduced its level of trust should be made aware that this is no longer true and the users that are going to request of a slice with a certain level of trust will receive the information that such a level is not available and that now the slice level is different and eventually decide to use it or avoid it and wait for when a new slice with the needed level is available. Other possible actions in case the e2e slice trustability level is too low are described further below.

The trust level can also change over time due to new vulnerabilities found in the software or hardware used for the slice components or because updates of the software or hardware have been made in the system used for the slice components. This might result in a slice with a certain trust level that is not available anymore. An operator of a slice for which the trust level has been reduced should be made aware that it is no longer a slice having the required trust level so that operators or users that are going to request a slice having a certain level of trust should receive the information that this level is not available and that the trust level of the slice has changed so that the operator can decide to use it or to avoid it and to wait when a new slice with the needed trust level is available again.

This is discussed in more detail in connection with FIG. 5.

In step S51 the security manager periodically checks the trust values of the slice components. In step S52 a new software or hardware vulnerability may have been detected so that the security manager is informed accordingly. In the same way a new software or hardware update may be detected in step S53 and the security manager 200 may be informed accordingly. The security manager then determines in step S54 a new trust value for the slice component for which the change has been detected, and it is determined in step S55 whether the trust value of the component has changed or not. If the trust value has changed the new value is stored in the software repository 70 in step S56. In step S57 it is checked whether the component for which the trust value has changed is used in any of the slices. If this is the case the network slice management entity should be informed in step S58.

The slice management entity 100 periodically checks whether any of the values have changed in step S60 and when the information about the changed trust value is received in step S59 the slice management entity calculates in step S61 a new trust level for the complete slice taking into account the newly received trust value. As discussed above when the trust values of the different slice components are known, different options exist to determine the trust level of the whole slice. The trust level may be the minimum trust value of any of the slice components, may be a weighted average, or any other possibility may be used to calculate the trust level of the complete slice. In step S62 it is asked whether the trust level of the complete slice has changed and if this is the case, different actions may be taken in order to overcome the changed trust value in step S63. The different options to overcome the changed trust level are discussed below and include actions such as the software or hardware update of the corresponding slice component, a more active monitoring of a slice component, the information of a service provider of the slice, the connection of new users to other slices or to remove the slice from the service and to move the service immediately to another slice with the requested trust level.

In step S64 it is checked whether the new trust level of the slice is above the required threshold or not. If this is not the case the operator/user of the network slice is informed accordingly in step S65.

Figure 5:
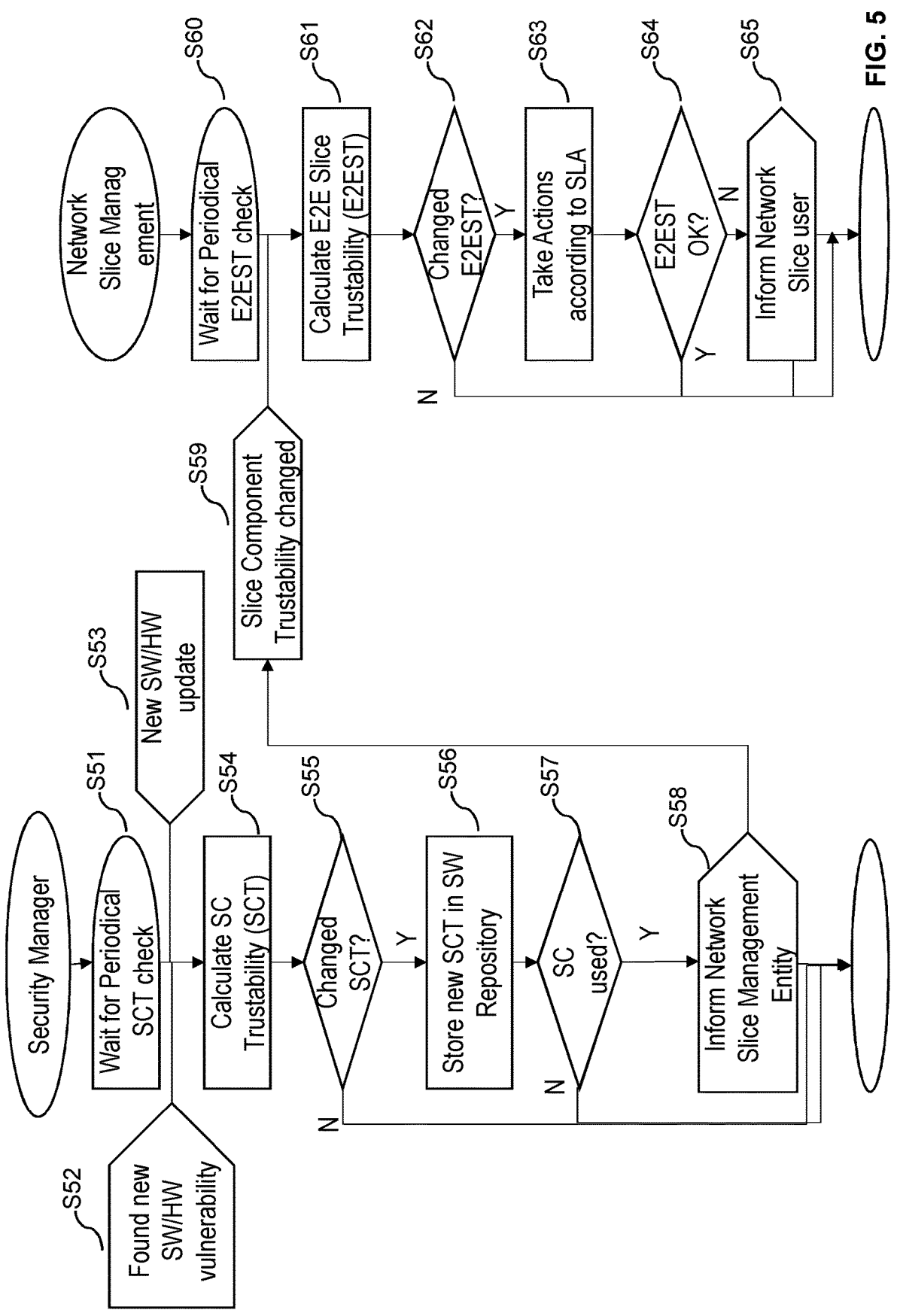
FIG. 5 shows a schematic view of a message exchange between the entities involved when there is a change of a trust value of one of the components used by a network slice.
Figure 6:
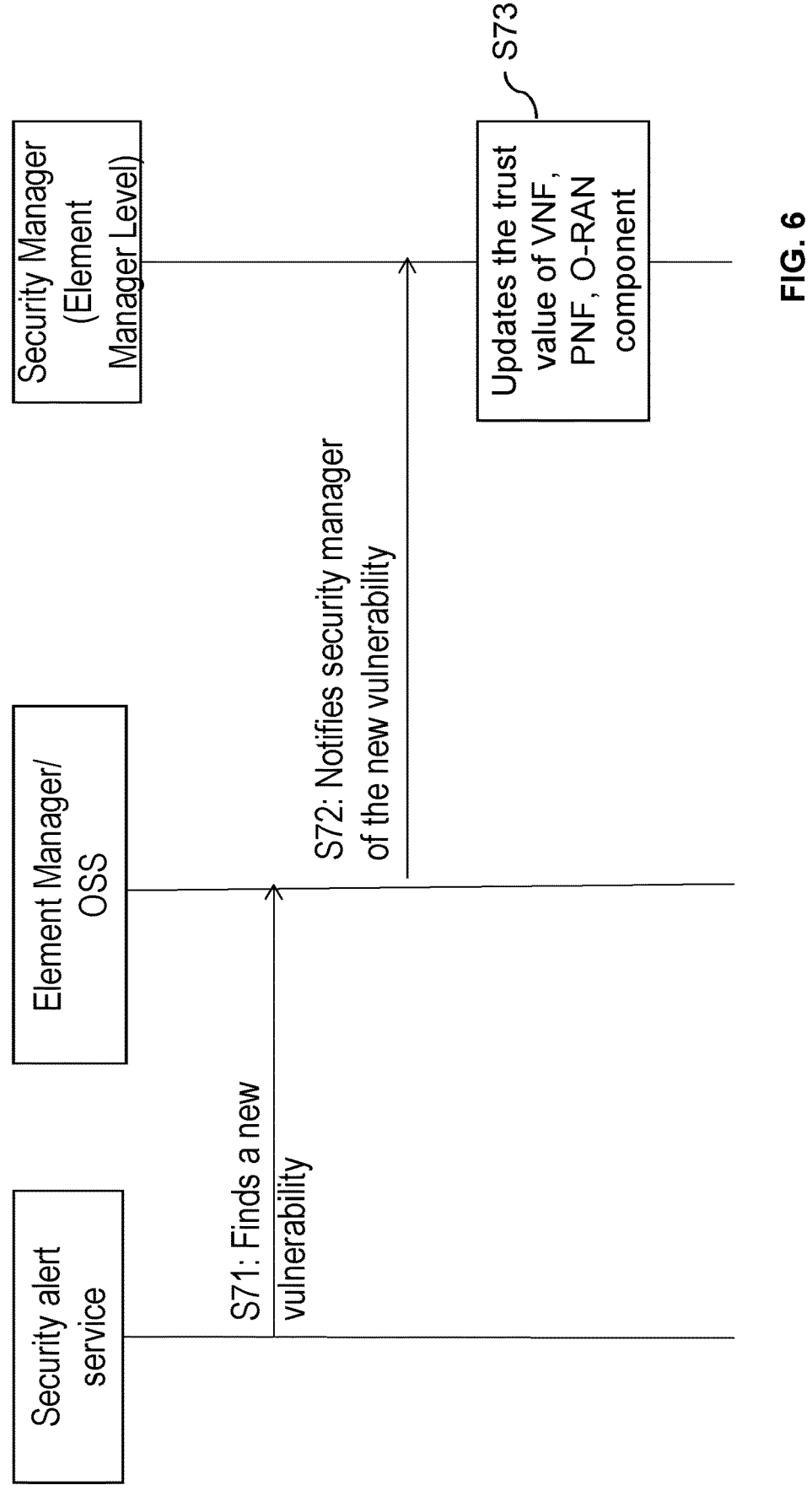
FIG. 6 shows a more detailed schematic view of a message exchange between the entities involved in the situation shown in FIG. 5.

FIG. 6 shows further details of the message exchange discussed in connection with FIG. 5. In step S71 the security alert service 30 finds a new vulnerability and informs the element manager 40 accordingly. The new vulnerability may be based on CVE as discussed above, however and other reason might exist, which initiates an alert that a new vulnerability exists. The element manager 40 notifies the security manager of the new vulnerability in step S72 and in step S73 the security manager updates the trust value of the corresponding component to which the identified vulnerability applies. The newly found vulnerability may apply to a single component of a slice or may apply to several components.

Figure 7:
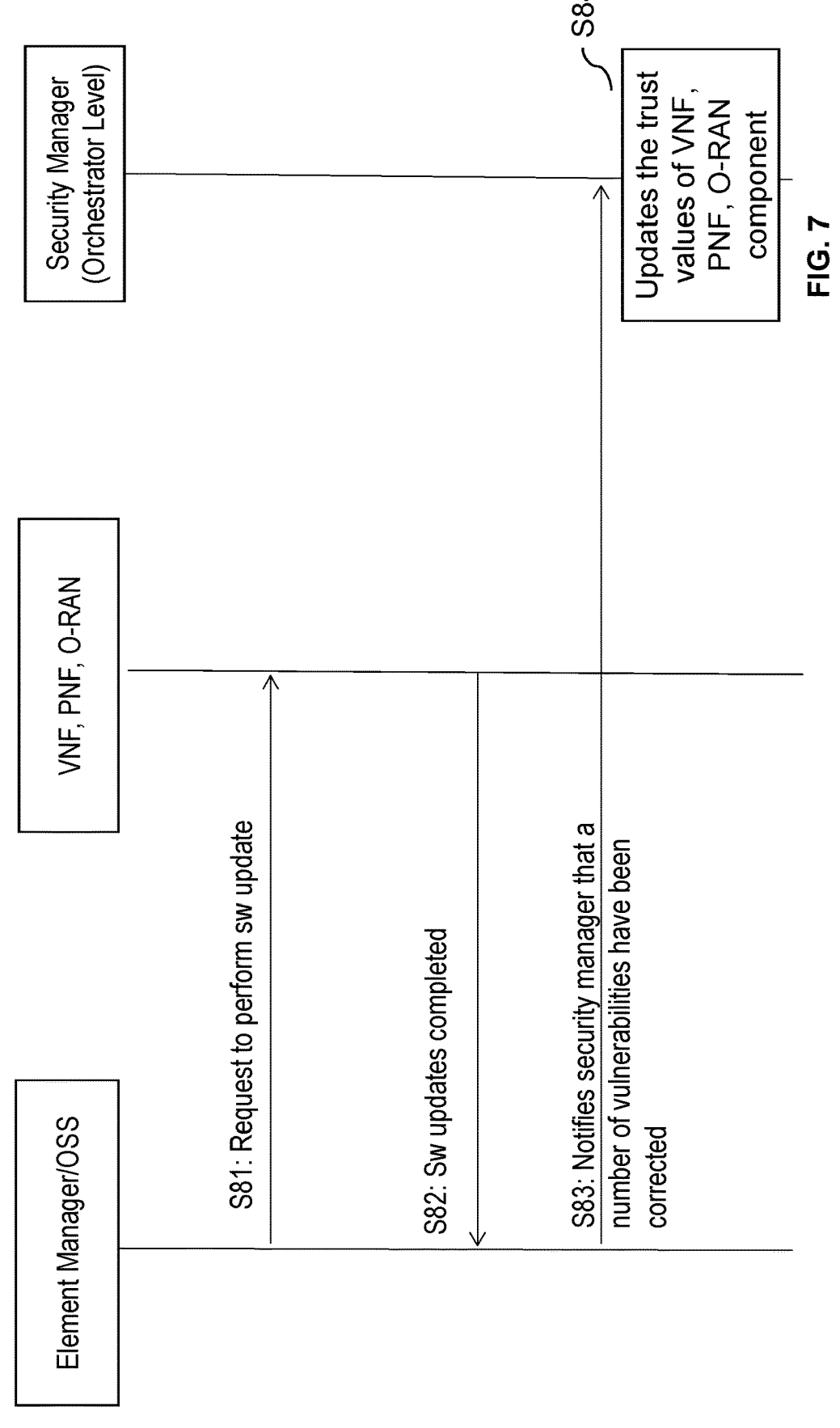
FIG. 7 shows another more detailed schematic view of a message exchange between the entities involved for the situation shown in FIG. 5.

FIG. 7 shows further details of the flow exchange shown in FIG. 5. The element manager 40 requests the corresponding component of the slice to perform a software update in step S81. In step S82 the corresponding component informs the element manager that the software has been updated successfully and in step S83 the element manager 40 informs the security management entity 200 that a number of vulnerabilities have been corrected so that in step S84 the security manager can update the trust values of the different hard- or software components.

Figure 8:
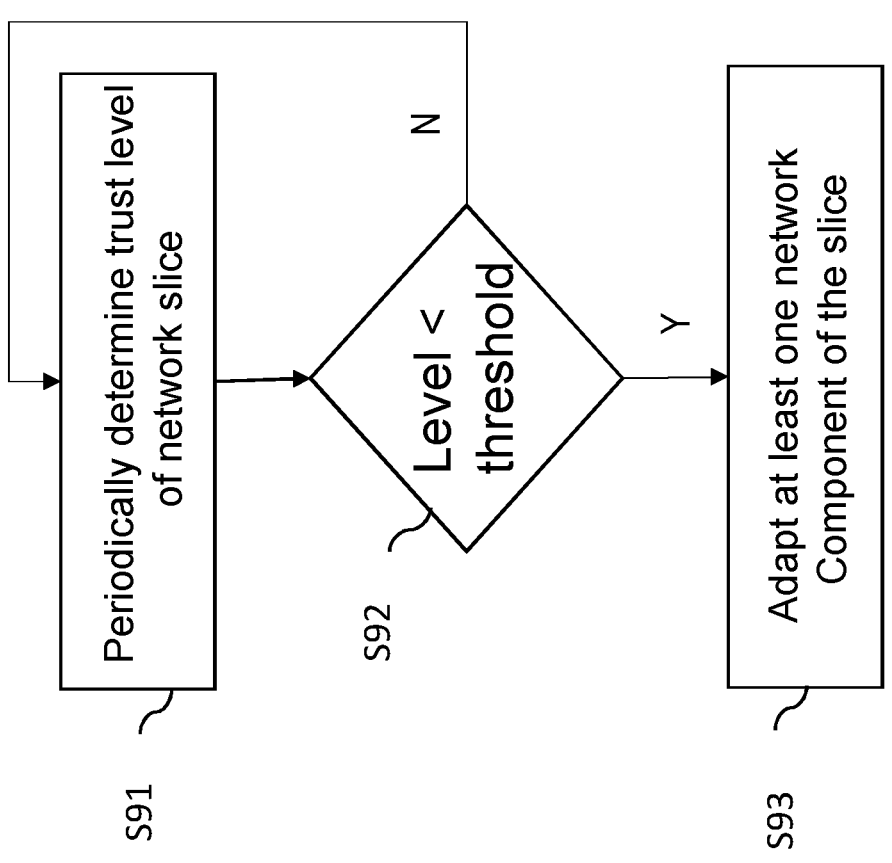
FIG. 8 shows an example flowchart of a method carried out by a slice management entity in the message flows discussed above.

FIG. 8 summarizes some of the main steps carried out by the slice management entity 100 in the different methods discussed above. In step S91 the slice management entity periodically determines the trust level of a network slice based on the trust values of the different components as discussed in connection with FIG. 5 in steps S60 and S61. In step S92 the slice management entity checks whether the level is above or below a defined minimum threshold level which is a level that may be requested by an operator of the slice. If the calculated trust level is not above the threshold or in other words if the level is below the threshold the at least one network component is adapted such a way so that, with the newly determined trust value for a network component, the trust level of the complete slice is again above the threshold.

Figure 9:
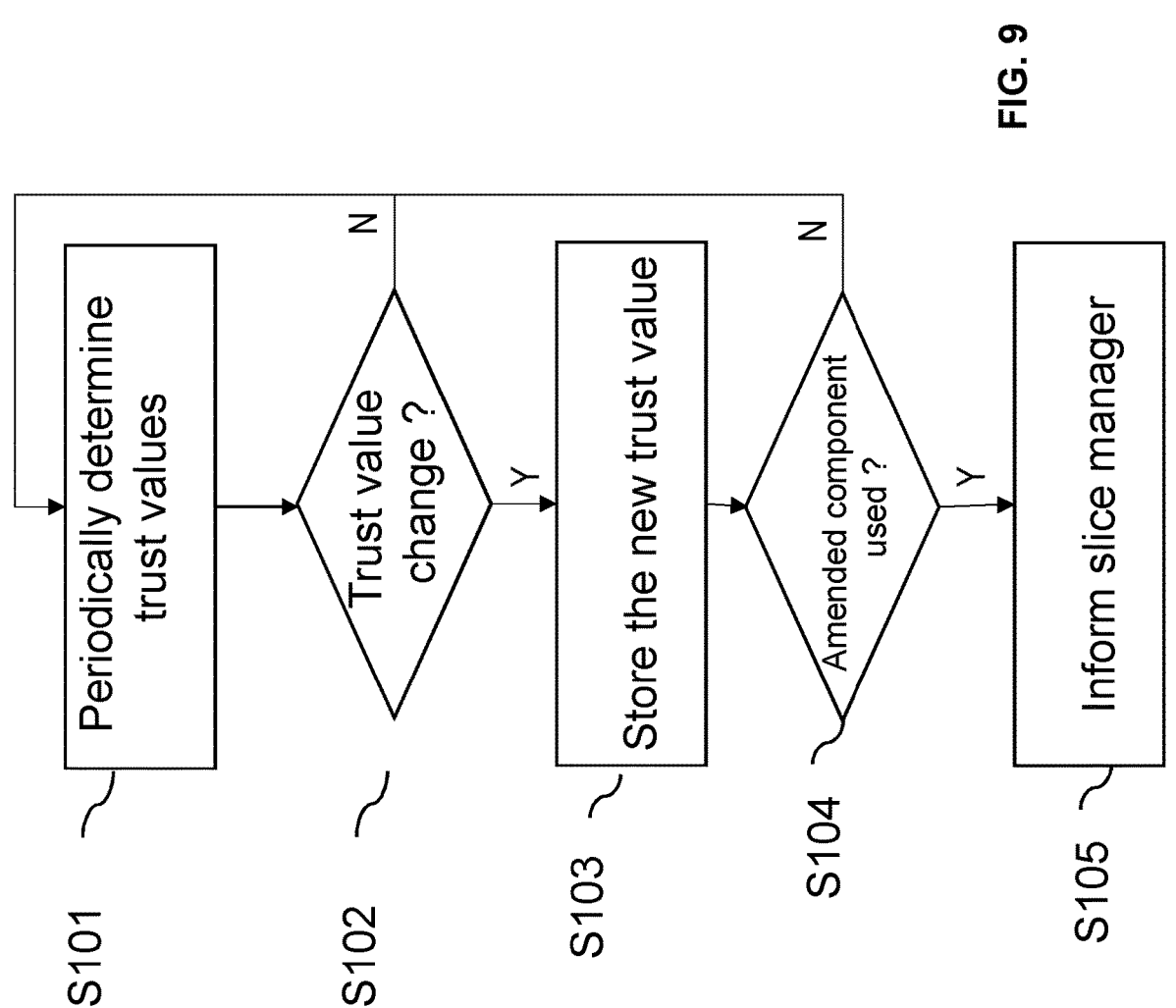
FIG. 9 shows an example flowchart of a method carried out by a security management entity in the message flows discussed above.

FIG. 9 summarizes some of the steps carried out by a security management entity 200 in the embodiments disclosed above. In step S101 the security management entity periodically determines the trust values for the different software or hardware components that are available in a cloud environment which is used for providing the components of a cellular network. As discussed in connection with FIG. 5 when either a software or hardware was updated or a new vulnerability was found it is checked in step S102 whether the trust value of any of the components has changed. In step S103 the new trust value is stored. In step S104 it is checked whether the component for which the trust value has changed is used in any of the slices. If this is not the case the system can continue to monitor the trust values. If it is however determined in step 104 that the component is used in any of the slices, the slice management entity is informed accordingly in step S105 and as discussed above in steps S58 and S59.

In the following a possible implementation of the changed trust level is discussed in more detail:

One possible implementation is the use of the NSSF as slice management entity.

The adaptation of the trust level could be handled in the NSSF. Below tables are from clause 5.1 of 3GPP TS 29.531 V16.4.0 (2020-09).

If there is any indication of reduced trust level of a system, it would be necessary for the slice provider to increase the level of monitoring or decide to add a specific security control to mitigate the situation. This is of course acceptable only to the level achieved with the additional measures that can be considered enough to keep the level. If there is no mitigation that can ensure the security level agreed in the SLA, the operator can be informed accordingly.

Based on the matrix provided in the SLA, according to the level of degradation of the slice trustability some specific actions need to be started. For example:

| Trust Level | Mitigation Actions |
|---|---|
| 80-100 | None |
| 79-70 | Active Monitoring and start actions to update slice components |
| 69-60 | Inform the Slice Provider with an alarm |
| 59-40 | Connect new users to a sub-slice with highest trust level |
| 39-0 | Stop the slice and move the Service immediately to another slice with requested trust level. |

If the trust level later is restored (e.g. >80), the slice actions are immediately stopped and the normal slice activity can be automatically resumed, according to the requested slice SLA.

Monitoring tools like SIEM, IDS, and others can be used to increase the slice trust level, the tool security level can be set according to the decreased trust level.

Slice user should indicate in the SLA the thresholds to be advised about low trust levels and also the possible actions to start using the matrix of security levels and mitigation actions.

Figures 10, 11:
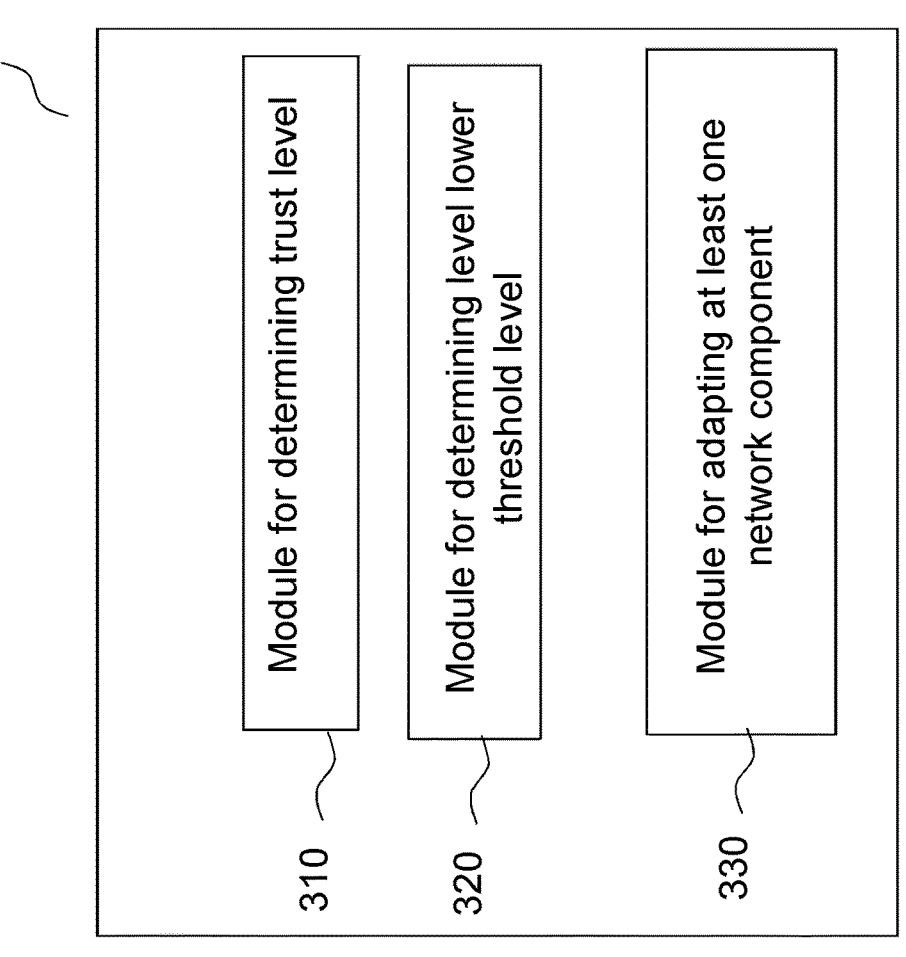
FIG. 10 shows an example schematic representation of a slice management entity configured to manage a network slice providing a certain trust level.
FIG. 11 shows another example schematic representation of a slice management entity configured to manage a network slice providing a certain trust level.

FIG. 10 shows a possible implementation of a slice management entity 100 which can carry out the above discussed steps in which the slice management entity is involved. The slice management entity 100 can be a functional entity provided as virtual entity in the cloud.

Accordingly, the functionality provided by the slice management entity may be distributed over different nodes of a

| Service Name | Description | Example Consumer |
|---|---|---|
| Nnssf_NSSelection | This service enables Network Slice selection in both the Serving PLMN and the HPLMN | AMF, V-NSSF |
| Nnssf_NSSAIAvailability | This service enables to update the S-NSSAI(s) the NF service consumer (e.g AMF) supports on a per TA basis on the NSSF and to subscribe and notify any change in status, on a per TA basis, of the SNSSAIs available per TA (unrestricted) and the restricted S-NSSAI(s) per PLMN in that TA in the serving PLMN of the UE. | AMF |

| Service Name | Clause | Description | OpenAPI Specification File | apiName | Annex |
|---|---|---|---|---|---|
| Nnssf_NSSelection | 6.1 | NSSF Network Slice Selection Service | TS29531_Nnssf_NSSelection.yaml | nnssf-nsselection | A.2 |
| Nnssf_NSSAIAvailability | 6.2 | NSSF NSSAI Availability Service | TS29531_Nnssf_NSSAIAvailability.yaml | nnssf-nssaiavailability | A.3 | cloud implementation. Nevertheless the slice management entity can comprise different hardware components also distributed in the cloud which are used to provide the corresponding function implemented by the slice management entity. These hardware components may be distributed over different nodes of a cloud environment as discussed above. The slice management entity comprises at least an interface 110 which is provided for transmitting user data or control messages to other entities and which is provided for receiving user data or control messages from other entities. The interface 110 may be used to receive the information that the trust value of a slice component has changed, may be used to inform other components that the software should be updated, or used to inform the operator of the slice when a trust level has changed and cannot be amended to a level high enough so that it meets any service level agreements with the operator of the slice. The slice management entity comprises a processing unit 120 comprising one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above-described functionalities in which the slice management entity is involved.

FIG. 11 shows another schematic implementation of a slice management entity comprising a first module 310 which is configured to periodically determine a trust level of the network slice based on the trust values of the components. A second module 320 is provided which determines whether the trust level is below or above a minimum threshold level. If the trust level is below a threshold level a further module 330 is configured to control at least one of the network components such that a new trust level can be determined with a new trust value of at least one network component and this new trust value leads to a new trust level of the slice above the threshold value.

Figure 12:
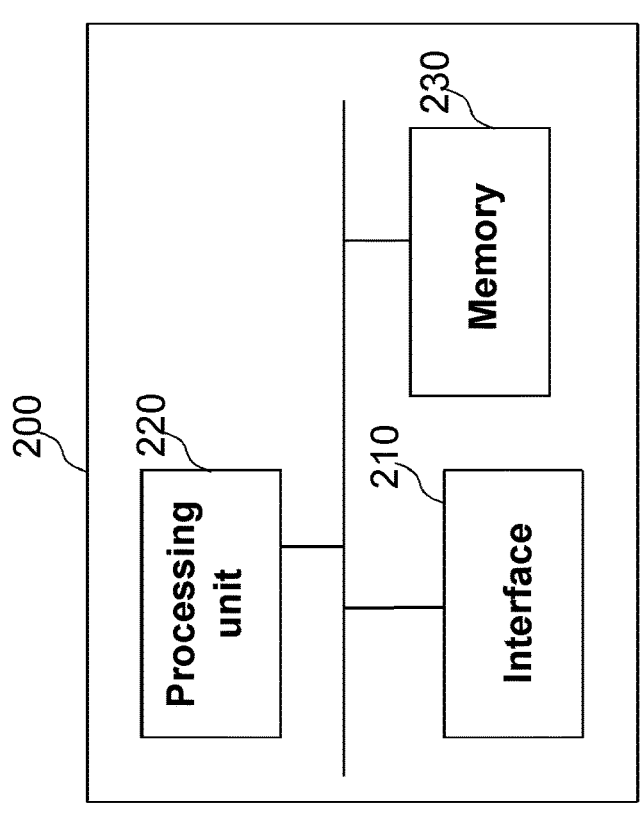
FIG. 12 shows an example schematic representation of a security management entity configured to orchestrate network slices which provide a certain trust level.

FIG. 12 shows a possible implementation of a security management entity which can carry out the steps in which it is involved as discussed in connection with FIGS. 2 to 7.

As already discussed in connection with the slice management entity, the security management entity 200 may also be implemented in a cloud environment and the functions provided by the security management entity may be distributed over different nodes and different hard- and software components. The hardware components in total comprise at least one interface 210 configured to receive user data or control messages and configured to transmit user data or control messages to other entities. The security management entity 200 comprises a processing unit 220 comprising one or more processors and which is responsible for the operation of the security management entity. The processing unit 220 can comprise one or more processors and can carry out instructions stored on a memory 230, wherein the memory may include a read-only memory, a random access memory, a mass storage, a hard disk or the like. The memory can furthermore include suitable program code to be executed by the processing unit 220 so as to implement the above-described functionalities in which the security management entities involved.

Figure 13:
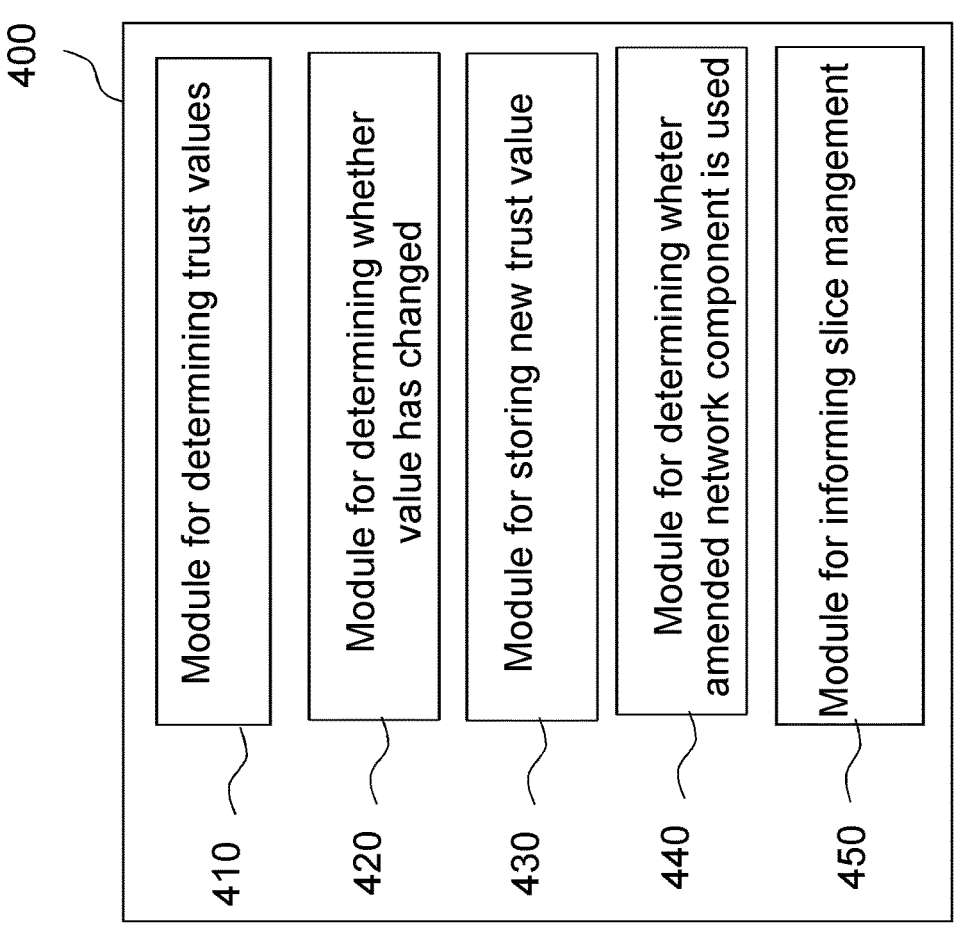
FIG. 13 shows another schematic representation of a security management entity configured to orchestrate network slices which provide a certain trust level.

FIG. 13 shows a further implementation of the security management entity. It comprises a first module configured to determine trust values of the network components, a module 420 configured to determine whether any of the trust values has changed. A module 430 is provided configured to store the new trust values, in case the value has changed. A module 440 is configured to determine whether a network component for which trust value has changed is used in any network slice. If this is the case module 450 is configured to inform the slice management entity accordingly.

From the above said some general conclusions can be drawn.

As far as the slice management entity 100 is concerned, when the slice management entity periodically determines the trust level, it detects a trigger event which occurs when a defined time period has lapsed or when a trigger message is received by which the slice management entity is informed that the time-dependent trust value of at least one of the network components has changed. As discussed in connection with step S60 in FIG. 5 the slice management entity periodically checks whether the trust values of the components have changed and the trigger event may be either the reception of a message or lapse of the certain time period.

When the trust level of the network slice is determined, it may be determined whether any of the trust values of the network components of the network slice have changed. If it is detected that the trust value of at least one network component of the network slice has changed, it is determined whether the determined trust level of the network slice is lower than the minimum threshold level. This was discussed above in steps S61 and S62 of FIG. 5.

Furthermore, it is possible that an operator of the network slice is informed when the controlling of the at least one network components cannot be adapted such that the trust level is again above the minimum threshold level. This was discussed above in connection with FIG. 5 steps S64 and S65.

The controlling of the at least one network component can mean that a software update for at least one network component is initiated, that a monitoring level of the at least one network component is increased or that additional security control measures are added. Furthermore if it is determined that the trust level is higher than a further threshold, the monitoring level may be decreased.

When the trust level is lower than a further threshold, a second threshold below the minimum threshold level, a process may be initiated by which no new users of the cellular network are admitted to the network slice.

When the trust level is periodically determined, a notification may be received from the security management entity 200 that the trust value of at least one of the network components has changed.

In an initial process, before the trust level of a network slice is determined, a request may be received from the requesting party which requests a network slice with a trust level above the minimum threshold level. When it is determined that the network slice having the trust level above the minimum threshold level is not yet available, new network components are selected which each have a corresponding trust value. Furthermore, a first trust level of the new slice is determined using the new network components and the corresponding trust values and it is checked whether the first trust level is above the minimum threshold level. If this is not the case the selecting and the determining is repeated until the first trust level is above the minimum threshold level.

This was discussed above in connection with FIG. 2 steps S25 to S29. The requested slice may be identified using a slice differentiator value wherein the slice differentiator value comprises the trust level above the minimum threshold level.

17

However, when it is determined that no new network component can be selected leading to the first trust level above the threshold level, the request is rejected as discussed in FIG. 2 step S31.

When the request of the new slice is received it is checked whether a network slice can be detected among the existing networks slices which has the trust level above the minimum threshold level. If this is the case, the network slice among the existing networks slices having a trust level above the minimum threshold level is assigned to the requesting party as discussed in steps S22 to S24 in FIG. 2.

When the trust level of network slice that is determined it is possible to take into account the trust values of all network components of the network slice.

Furthermore, it is possible that the trust level of the network slice is determined such that it corresponds to the lowest trust value of network components building the network slice. In another option it is possible to determine the trust level of network slice based on a weighted average of the trust values of the network components building the network slice.

Furthermore, it is possible to the determined the trust level by taking into account corresponding weakness levels of each of the network components building a network slice wherein the weakness level describes how vulnerable a corresponding network component is to the common vulnerabilities and exposures, CVE parameter.

The method discussed above has the right balance between security requirements and costs. Requirement of the trust level can be readily verified and the slice type using as one option the existing mechanism of the slice differentiator, SD.

Furthermore a network operator can submit requests to the slice provider including a requested trust value so that there is the right balance between security requirements and costs.

The above discussed invention helps to obtain and maintain slices which meet a certain trust level.

The invention claimed is:

1. A computer implemented method implemented using at least one processing circuitry and a memory for operating a slice management entity configured to manage a network slice of a cellular network, the method comprising:

periodically determining a trust level of the network slice based on time dependent trust values of network components used by the network slice;

determining whether the determined trust level of the network slice is lower than a minimum threshold level;

responsive to the determined trust level being lower than the minimum threshold level, adapting control of at least one of the network components of the network slice to obtain a new trust value for the at least one network component;

responsive to the determined trust level being lower than a second threshold below the minimum threshold level, initiating a process by which no new users of the cellular network are admitted to the network slice; and periodically determining the trust level of the network slice comprising determining a new trust level of the network slice that is above the minimum threshold level based on the new trust value.

2. The method according to claim 1, wherein periodically determining comprises detecting a trigger event occurring when a defined time period has lapsed or when a trigger message is received by which the slice management entity is informed that the time dependent trust value of at least one of the network components has changed.

3. The method according to claim 1, wherein periodically determining a trust level of the network slice comprises determining whether any of the trust values of the network components of the network slice has changed, wherein if it is detected that the trust value of the at least one network component of the network slice has changed, it is determined whether the determined trust level of the network slice is lower than a minimum threshold level.

4. The method according to claim 1, further comprising informing an operator of the network slice when the controlling of the at least one of the network components cannot be adapted such that the trust level of the network slice is above the minimum threshold level.

5. The method according to claim 1, wherein the adapting control comprises:

initiating a software update for the at least one network component; and/or increasing a monitoring level of the at least one network component; and/or adding additional security control measures to the at least one network component; and/or decreasing a monitoring level of the at least one network component when the trust level is above a further threshold.

6. The method according to claim 1, wherein periodically determining the trust level comprises receiving a notification from a security management entity of the cellular network, that the trust value of the at least one network component has changed.

7. The method according to claim 1, further comprising:

receiving, before the trust level of the network slice is determined, a request from a requesting party requesting the network slice with a trust level above the minimum threshold level;

responsive to determining that the network slice having the trust level above the minimum threshold level is not available:

selecting new network components, each of them having a corresponding trust value;

determining a first trust level for the new slice determined for the new network components; and checking whether the first trust level is above the minimum threshold level, wherein if this is not the case, the selecting and determining is repeated until the first trust level is above the minimum threshold level.

8. The method according to claim 7, wherein the requested slice is identified based on a slice differentiator value, wherein the slice differentiator value comprises the trust level above the minimum threshold.

9. The method according to claim 1, wherein periodically determining the trust level is further based on a corresponding weakness level of each of the network components constituting the network slice, the weakness level describing how vulnerable a corresponding network component is to a Common Vulnerabilities and Exposures parameter.

10. A slice management entity for managing a network slice of a cellular network, the slice management entity comprising:

processing circuitry and memory, the memory containing instructions executable by the process circuitry whereby the slice management entity is configured to:

periodically determine a trust level of the network slice based on time dependent trust values of network components used by the network slice;

determine whether the determined trust level of the network slice is lower than a minimum threshold level; and responsive to the determined trust level being lower than the minimum threshold level, adapt control of at least one of the network components of the network slice to obtain a new trust value for the at least one network component;

responsive to the determined trust level being lower than a second threshold below the minimum threshold level, initiating a process by which no new users of the cellular network are admitted to the network slice; and to periodically determine the trust level of the network slice, the slice management entity being configured to determine a new trust level of the network slice that is above the minimum threshold level based on the new trust value.

11. The slice management entity according to claim 10, wherein to periodically determine the trust level, the slice management entity is configured to detect a trigger event occurring when a defined time period has lapsed or when a trigger message is received by which the slice management entity is informed that the time dependent trust value of at least one of the network components has changed.

12. The slice management entity according to claim 10, wherein to periodically determine the trust level of the network slice, the slice management entity is configured to determine whether any of the trust values of the network components of the network slice has changed, wherein if it is detected that the trust value of the at least one network component of the network slice has changed, it is determined whether the determined trust level of the network slice is lower than a minimum threshold level.

13. The slice management entity according to claim 10, wherein the slice management entity is further configured to inform an operator of the network slice when the controlling of the at least one of the network components cannot be adapted such that the trust level of the network slice is above the minimum threshold level.

14. The slice management entity according to claim 10, wherein to adapt control of at least one network component, the slice management entity is configured to perform at least one of the following:

initiate a software update for the at least one network component;

increase a monitoring level of the at least one network component;

add additional security control measures to the at least one network component; and decrease a monitoring level of the at least one network component, if the trust level is above a further threshold.

15. The slice management entity according to claim 10, wherein to periodically determine the trust level, the slice management entity is configured to receive a notification from a security management entity of the cellular network, that the trust value of the at least one network component has changed.

16. The slice management entity according to claim 10, wherein the slice management entity is further configured to:

receive, before the trust level of the network slice is determined, a request from a requesting party requesting the network slice with a trust level above the minimum threshold level;

responsive to the network slice having the trust level above the minimum threshold level being unavailable:

select new network components, each of them having a corresponding trust value;

determine a first trust level for the new slice determined for the new network components; and check whether the first trust level is above the minimum threshold level, wherein if this is not the case, the selecting and determining is repeated until the first trust level is above the minimum threshold level.

17. The slice management entity according to claim 15, wherein the requested slice is identified based on a slice differentiator value, wherein the slice differentiator value comprises the trust level above the minimum threshold.

18. A non-transitory computer readable medium storing a computer program product for controlling a slice management entity, the computer program product comprising software instructions that, when run on the slice management entity, cause the slice management entity to:

periodically determine a trust level of the network slice based on time dependent trust values of network components used by the network slice;

determine whether the determined trust level of the network slice is lower than a minimum threshold level;

responsive to the determined trust level being lower than the minimum threshold level, adapt control of at least one of the network components of the network slice to obtain a new trust value for the at least one network component;

responsive to the determined trust level being lower than a second threshold below the minimum threshold level, initiating a process by which no new users of the cellular network are admitted to the network slice; and to periodically determine the trust level of the network slice, the slice management entity being caused to determine a new trust level of the network slice that is above the minimum threshold level and is calculated based on the new trust value.

\* \* \* \* \*